US011639207B2

(12) United States Patent
Watanabe et al.

(10) Patent No.: US 11,639,207 B2
(45) Date of Patent: May 2, 2023

(54) AIRFLOW ADJUSTING APPARATUS

(71) Applicant: SUBARU CORPORATION, Tokyo (JP)

(72) Inventors: Naoto Watanabe, Tokyo (JP); Yusaku Dogahira, Tokyo (JP)

(73) Assignee: Subaru Corporation, Tokyo (JP)

( * ) Notice: Subject to any disclaimer, the term of this patent is extended or adjusted under 35 U.S.C. 154(b) by 49 days.

(21) Appl. No.: 17/369,588

(22) Filed: Jul. 7, 2021

(65) Prior Publication Data
US 2022/0033013 A1 Feb. 3, 2022

(30) Foreign Application Priority Data
Jul. 31, 2020 (JP) .............................. JP2020-129790

(51) Int. Cl.
B62D 35/02 (2006.01)
H05H 1/24 (2006.01)
B62D 37/02 (2006.01)

(52) U.S. Cl.
CPC ............. B62D 35/02 (2013.01); B62D 37/02 (2013.01); H05H 1/2439 (2021.05)

(58) Field of Classification Search
CPC ....... B62D 35/02; B62D 37/02; H05H 1/2439
See application file for complete search history.

(56) References Cited

U.S. PATENT DOCUMENTS

| 2012/0061993 A1 | 3/2012 | Hasegawa et al. |
| 2017/0057565 A1* | 3/2017 | Sarhadiangardabad ..................... B62D 35/02 |
| 2019/0342985 A1* | 11/2019 | Dadheech ............ H05H 1/2406 |

FOREIGN PATENT DOCUMENTS

| CN | 105263728 B | * 11/2017 | ............. B60C 13/00 |
| DE | 102019110773 A1 | * 11/2019 | ............. B62D 35/00 |
| GB | 2570457 A | * 7/2019 | ............. B62D 35/02 |
| JP | 2012-056499 A | 3/2012 | |
| JP | 2019-111965 A | 7/2019 | |

* cited by examiner

Primary Examiner — Lori L Lyjak
(74) Attorney, Agent, or Firm — McGinn I.P. Law Group, PLLC.

(57) ABSTRACT

An airflow adjusting apparatus to be provided in a vehicle includes airflow generators. The vehicle includes a front wheel and a rear wheel that are disposed in a vehicle longitudinal direction to be partly protruded from a bottom surface of a vehicle body of the vehicle downward in a vertical direction of the vehicle body. The airflow generators are provided on the bottom surface of the vehicle body and behind the front wheel. Each of the airflow generators is configured to generate an airflow along an underside of the vehicle body. The airflow has a speed component moving vehicle-widthwise inward. The airflow generators are disposed in a distributed arrangement in the vehicle longitudinal direction.

10 Claims, 5 Drawing Sheets

AIRFLOW ADJUSTING APPARATUS

CROSS-REFERENCE TO RELATED APPLICATIONS

This application claims priority from Japanese Patent Application No. 2020-129790 filed on Jul. 31, 2020, the entire contents of which are hereby incorporated by reference.

BACKGROUND

The disclosure relates to an airflow adjusting apparatus that adjusts airflows between an underneath of a vehicle body of a vehicle and a road surface.

For vehicles such as a four-wheeled automobile, airflows colliding with a wheel under a vehicle body disturb a flow field, causing aggravation of, for example, air resistance, aerodynamic noise, and aerodynamic vibration. This leads to a desire for suppression of disturbance of airflows around the wheel.

As an existing airflow adjusting technique around the wheel, for example, Japanese Unexamined Patent Application Publication (JP-A) No. 2012-56499 describes an airflow adjusting apparatus including a flap. The flap protrudes, in front of a wheel house, downward from a vehicle body. The flap suppresses a relative wind, or a so-called traveling wind, from colliding with the wheel, leading to reduction in an overall drag of a vehicle. A relative wind refers to an airflow that moves relative to the vehicle body in accompaniment with travel of the vehicle.

Moreover, in recent years, proposals have been made for airflow adjustment around the vehicle body with the use of a device that actively generates an airflow.

For example, JP-A No. 2019-111965 describes a windshield wiper that wipes a windshield of a vehicle. The windshield wiper includes a wiper arm provided with a plasma actuator that jets out an airflow.

SUMMARY

An aspect of the technology provides an airflow adjusting apparatus to be provided in a vehicle. The vehicle includes a front wheel and a rear wheel that are disposed in a vehicle longitudinal direction to be partly protruded from a bottom surface of a vehicle body of the vehicle downward in a vertical direction of the vehicle body. The airflow adjusting apparatus includes airflow generators. The airflow generators are provided on the bottom surface of the vehicle body and behind the front wheel. Each of the airflow generators is configured to generate an airflow along the bottom surface of the vehicle body. The airflow has a speed component moving vehicle-widthwise inward. The airflow generators are disposed in a distributed arrangement in the vehicle longitudinal direction.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
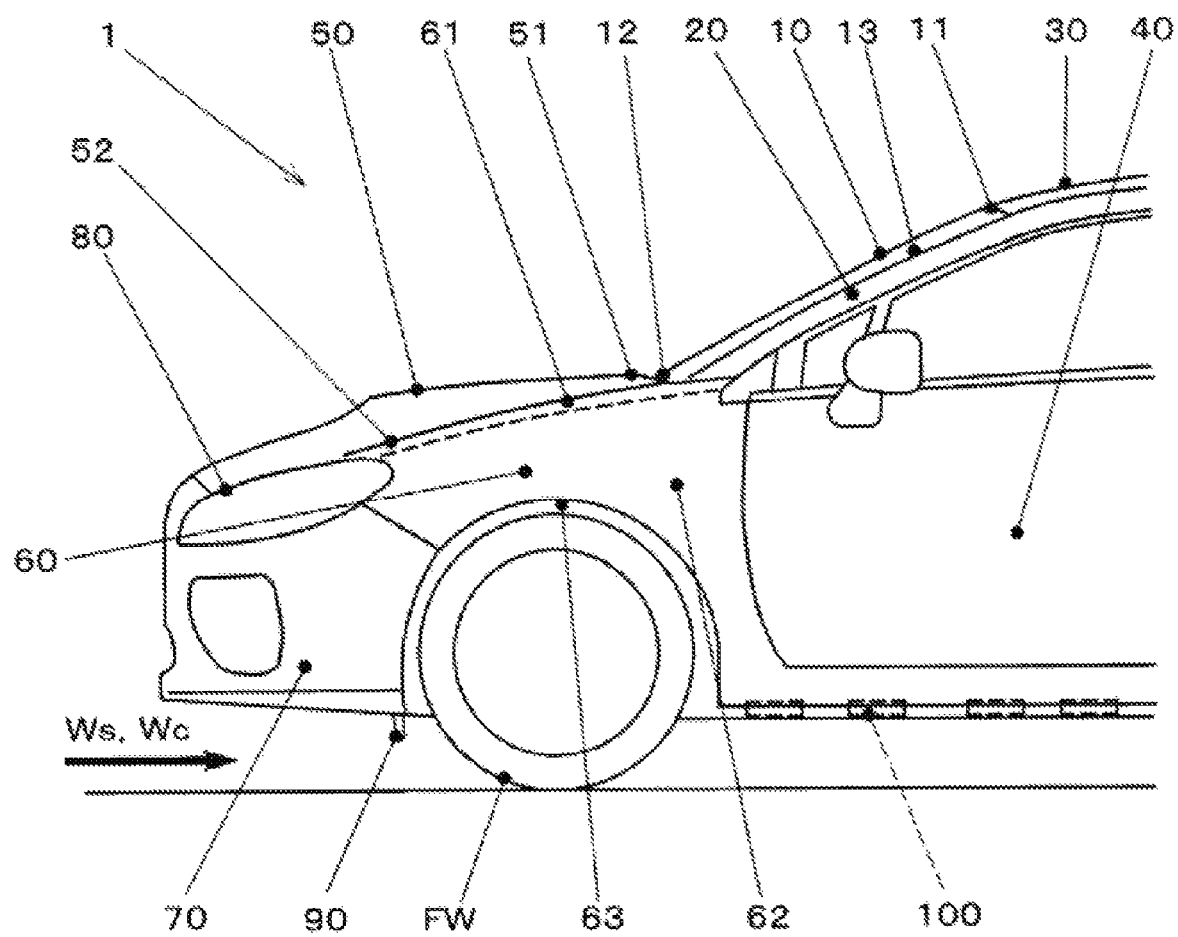
FIG. 1 is a schematic side view of a front portion of a vehicle body of a vehicle including an airflow adjusting apparatus according to a first embodiment of the disclosure.

In a flow field around a wheel house that houses a front wheel, in the space between an underneath of a vehicle body of a vehicle and a road surface, an airflow moving slowly vehicle-widthwise centrally of the vehicle may cause Karman vortex on rear side of the vehicle.

Moreover, an airflow having separated itself at the front wheel or other components around the front wheel is sometimes discharged vehicle-widthwise outward as a slow, turbulent flow. This may disturb a flow field along an outer side surface of the vehicle body.

Such phenomena may constitute a cause of aggravation of air resistance and operation stability of the vehicle.

It is desirable to provide an airflow adjusting apparatus that makes it possible to appropriately adjust airflows that have separated themselves at or around front wheels.

First Embodiment

Some embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same reference characters to avoid redundant description, and elements not in direct relation to the technology may not be illustrated.

In the following, an airflow adjusting apparatus according to a first embodiment of the disclosure is described.

The airflow adjusting apparatus according to the first embodiment may be provided in, for example, an automobile, or a moving body. The automobile may be, for example, a passenger car of a so-called two-box or three-box vehicle shape that includes an engine room in front of a cabin.

FIG. 1 is a schematic side view of a front portion of a vehicle body of a vehicle including the airflow adjusting apparatus according to the first embodiment.

A vehicle 1 may include, without limitation, a windshield 10, a front pillar 20, a roof 30, a front door 40, a hood 50, a fender 60, a bumper face 70, a front combination lamp 80, and a flap 90.

The windshield 10 is a glass window provided in a front portion of the cabin. The windshield 10 may have a substantially rectangular shape. The windshield 10 may be disposed in a backward tilted attitude, with an upper end 11 positioned on rear side of the vehicle relative to a lower end 12.

A side end 13 of the windshield 10 may be disposed along the front pillar 20.

The windshield 10 may include laminated glass of a quadric surface, and be curved or rounded to protrude toward front side of the vehicle.

The front pillar 20, or an A pillar, is a vehicle body structural member that extends along the side end 13 of the windshield 10.

A back end of the front pillar 20 may be disposed in adjacency to a sash provided around a front glass door in an upper portion of the front door 40.

The roof 30 is a panel that constitutes an upper surface of the cabin.

The roof 30 may extend, from the upper end 11 of the windshield 10, toward the rear side of the vehicle.

The front door 40 may be an openable and closeable door provided in a side surface of the front portion of the cabin.

The front door 40 may open or close by pivoting around an unillustrated hinge provided at a front end of the front door 40.

The hood 50 is an exterior member provided over an upper portion of the engine room. The hood 50 may be a lid-shaped body of an open and close type.

A rear edge 51 of the hood 50 may be disposed in front of the lower end 12 of the windshield 10, in spaced relation from the lower end 12 in a vehicle longitudinal direction.

The rear edge 51 may be of a curved shape protruded forward of the vehicle in plan view.

A side edge 52 of the hood 50 may be disposed in adjacency to a vehicle-widthwise inner edge of an upper surface 61 of the fender 60, with a gap in between. The gap is unavoidably provided.

The fender 60 is an exterior member of the vehicle that constitutes, for example, a side surface of the engine room.

The fender 60 may include, without limitation, the upper surface 61 and a side surface 62.

The upper surface 61 is a region adjacent to a side end of the side edge 52 of the hood 50. The upper surface 61 may be formed to trace broadly a curved plane extending vehicle-widthwise outward from a curved plane of an outer surface of the hood 50.

The side surface 62 may extend downward from the vicinity of a vehicle-widthwise outer end of the upper surface 61.

Moreover, the side surface 62 may have an arcuate notch 63 of a wheel house that houses a front wheel FW.

The bumper face 70 is a resin-made exterior member provided in a lower portion of a front end of the vehicle.

The bumper face 70 may be provided in front of the arcuate notch 63 in the fender 60.

The front combination lamp 80 may include various lighting devices housed and unitized in a common housing. Non-limiting examples of the lighting devices may include a headlamp, a position lamp, and a turn signal lamp.

The front combination lamp 80 may be disposed on lower side of the hood 50 and on upper side of the bumper face 70 at the front end of the vehicle.

The flap 90 is a plate member protruded, in front of the front wheel FW, downward from a bottom surface of the vehicle body.

The flap 90 may laterally separate a relative wind W, or a traveling wind, flowing from forward of the vehicle toward under a floor of the vehicle, to make airflow adjustment and to suppress the relative wind W from colliding with the front wheel FW. A relative wind W refers to an airflow that moves relative to the vehicle body in accompaniment with travel of the vehicle.

The airflow adjusting apparatus of the embodiment may include a plasma actuator 100 described below.

Figure 2:
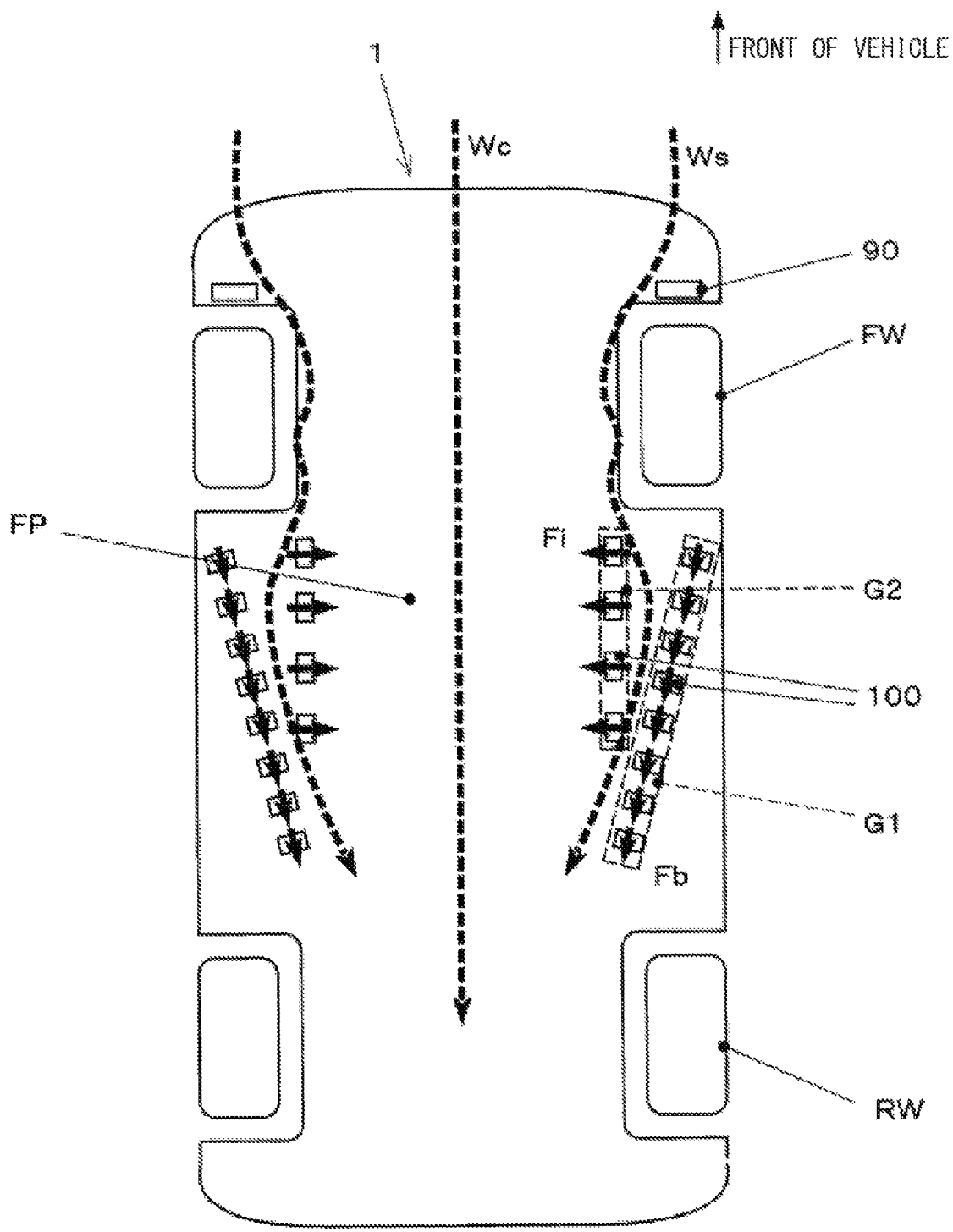
FIG. 2 schematically illustrates the vehicle according to the first embodiment, as viewed from underneath.

FIG. 2 schematically illustrates the vehicle of the embodiment, as viewed from underneath.

As illustrated in FIG. 2, a plurality of plasma actuators 100 is provided in an underneath of the vehicle body of the vehicle 1.

The plurality of the plasma actuators 100 is each configured to generate an airflow F, with electric power supplied from a power supply device. In one embodiment of the disclosure, the plasma actuator 100 may serve as an "airflow generator".

The plurality of the plasma actuators 100 is each configured to generate, or eject, the airflow F substantially along a horizontal direction, along a floor panel FP. The floor panel FP may constitute an underside of the vehicle body.

The plurality of the plasma actuators 100 may include a first group G1 and a second group G2 described below. The first group G1 and the second group G2 may each include a plurality of the plasma actuators 100.

The plasma actuators 100 of the first group G1 may be disposed between a rear end of the wheel house that houses the front wheel FW, and a front end of a wheel house that houses a rear wheel RW.

The plasma actuators 100 included in the first group G1 may each be configured to generate an airflow Fb that moves backward of the vehicle and vehicle-widthwise inward, and moves obliquely relative to the vehicle longitudinal direction.

The plasma actuators 100 included in the first group G1 may be disposed in a single, straight line along a direction of generation of the airflow Fb. That is, the plasma actuators 100 of the first group G1 may be positioned vehicle-widthwise outwardly from one another sequentially from the front side of the vehicle.

The plasma actuators 100 of the second group G2 may be disposed vehicle-widthwise inwardly from the first group G1.

The plasma actuators 100 included in the second group G2 may each be configured to generate an airflow Fi that moves toward centrally of the vehicle substantially along a vehicle widthwise direction.

The plasma actuators 100 included in the second group G2 may be disposed in a single, straight line in the vehicle longitudinal direction.

Figure 3:
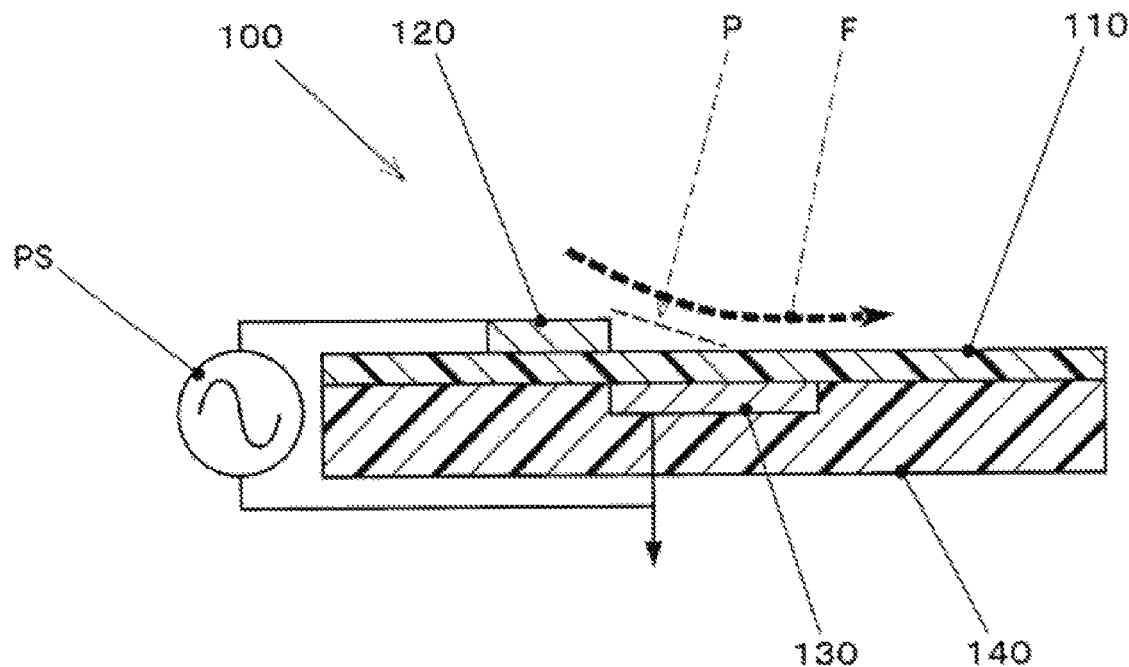
FIG. 3 is a schematic cross-sectional view of a bipolar plasma actuator to be provided in the airflow adjusting apparatus according to the first embodiment.

FIG. 3 is a schematic cross-sectional view of a bipolar plasma actuator to be provided in the airflow adjusting apparatus of the embodiment.

The bipolar plasma actuator 100 may include, without limitation, a dielectric 110, an upper electrode 120, a lower electrode 130, and an insulator 140.

The dielectric 110 may be a sheet-shaped member including, for example, a fluorocarbon resin such as polytetrafluoroethylene.

The upper electrode 120 and the lower electrode 130 may each include an electrically-conductive tape including a thin metal film of, for example, copper.

The upper electrode 120 may be attached to outer surface side of the dielectric 110. The outer surface side of the dielectric 110 refers to side exposed to the outside when the plasma actuator 100 is attached to, for example, the vehicle body.

The lower electrode 130 may be attached to inner surface side of the dielectric 110 that is opposite to the outer surface side of the dielectric 110.

The upper electrode 120 and the lower electrode 130 may be offset in an in-plane direction of the dielectric 110.

The insulator 140 may be a sheet-shaped member that serves as a base of the plasma actuator 100. The insulator 140 may be provided, on the inner surface side of the dielectric 110, to cover the lower electrode 130.

Allowing a power supply PS to apply an alternating voltage having a predetermined waveform to the upper electrode 120 and the lower electrode 130 of the plasma actuator 100 causes generation of a plasma discharge P between the electrodes.

It is necessary for the applied voltage to be high enough to cause electrical breakdown and generate the plasma discharge P. For example, the applied voltage may range from about 1 kV to about 10 kV.

A frequency of the applied voltage may range, for example, from about 1 kHz to about 10 kHz.

At this occasion, the air on the outer surface side of the plasma actuator 100 is drawn to the plasma discharge P, causing generation of the airflow F in a wall jet.

Moreover, the plasma actuator 100 is configured to reverse a direction of the airflow F, by controlling the waveform of the alternating voltage to be applied.

The airflow adjusting apparatus of the embodiment may include a control system described below, to supply driving electric power to the plasma actuator 100 described above, allowing the plasma actuator 100 to generate the airflow F for airflow adjustment of airflows moving between the underneath of the vehicle body and the road surface.

Figure 4:
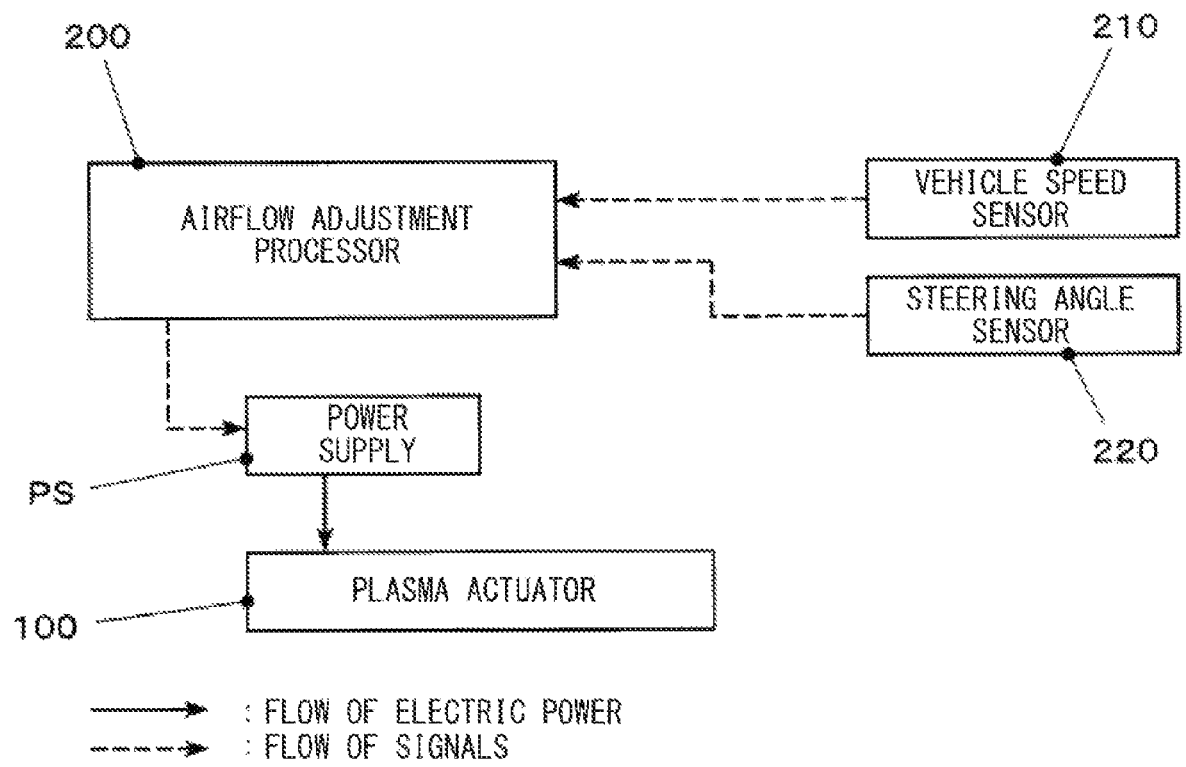
FIG. 4 is a block diagram illustrating a configuration of a control system of the plasma actuator in the airflow adjusting apparatus according to the first embodiment.

FIG. 4 is a block diagram illustrating a configuration of the control system of the plasma actuator in the airflow adjusting apparatus of the embodiment.

The control system may include, without limitation, an airflow adjustment processor 200, a vehicle speed sensor 210, and a steering angle sensor 220.

The airflow adjustment processor 200 may control the power supply PS to control whether to operate or stop the plasma actuator 100. In operating the plasma actuator 100, the airflow adjustment processor 200 may control strength of the airflow F, e.g., an amount of flow and a flow rate.

The airflow adjustment processor 200 may include, for example, a microcomputer including, without limitation, an information processor such as a CPU (Central Processing Unit), a storage such as a RAM (Random Access Memory) and/or a ROM (Read Only Memory), input and output interfaces, and a bus that couples them together.

The vehicle speed sensor 210 may detect a traveling speed of the vehicle 1, or a vehicle speed.

The vehicle speed sensor 210 may be provided in a hub bearing housing that rotatably holds the front wheel FW or the rear wheel RW. The vehicle speed sensor 210 is configured to output a vehicle speed signal corresponding to a rotational speed of the wheel.

The steering angle sensor 220 may detect a steering angle of the front wheel FW.

The steering angle sensor 220 may be provided as, for example, a part of an unillustrated electric power steering device. The steering angle sensor 220 may include an angle encoder that detects an angle position of a steering shaft. The steering shaft may transmit rotation of a steering wheel to a steering gear box.

The airflow adjustment processor 200 may operate the plasma actuators 100 of the first group G1 and the second group G2 to generate the airflows Fb and Fi in a case where the vehicle speed detected by the vehicle speed sensor 210 is equal to or higher than a predetermined threshold.

The airflows Fb and Fi move substantially horizontally along a floor surface of the vehicle 1, that is, along the floor panel FP.

Moreover, strength of the airflows Fb and Fi may be set to increase in accordance with an increase in the vehicle speed detected by the vehicle speed sensor 210.

In the following, workings and effects of the embodiment are described.

As illustrated in FIG. 2, relative winds, i.e., so-called traveling winds, flow into between the vehicle body and the road surface from the front side of the vehicle. The relative winds include a relative wind Ws flowing vehicle-widthwise sideways of the vehicle. A component of the relative wind Ws collide with the flap 90 and the front wheel FW, to flow into vehicle-widthwise inward of the front wheel FW.

In a case with a vehicle devoid of an airflow adjusting apparatus such as the plasma actuators 100, such a component of the relative wind Ws is cornered behind the front wheel FW and the wheel house that houses the front wheel FW. This causes a significant decrease in the flow rate of the relevant component of the relative wind Ws, to form airflow stagnation, i.e., a so-called cut-off region.

In contrast, in the embodiment, the plasma actuators 100 of the first group G1 generate the airflows Fb, accelerating and discharging the air behind the front wheel FW backward of the vehicle and vehicle-widthwise inward, to join a relative wind Wc moving vehicle-widthwise centrally.

Moreover, such a flow of the relative wind Ws is drawn vehicle-widthwise inward by the airflows Fi generated by the plasma actuators 100 of the second group G2.

This allows reliably the relative wind Ws moving vehicle-widthwise sideways of the vehicle to join the relative wind Wc moving centrally of the vehicle. Hence, it is possible to prevent more reliably the relative wind Ws from colliding with the rear wheel RW.

Moreover, behavior of the relative winds and airflows behind the front wheel FW also varies with the steering angle of the front wheel FW.

Figure 5:
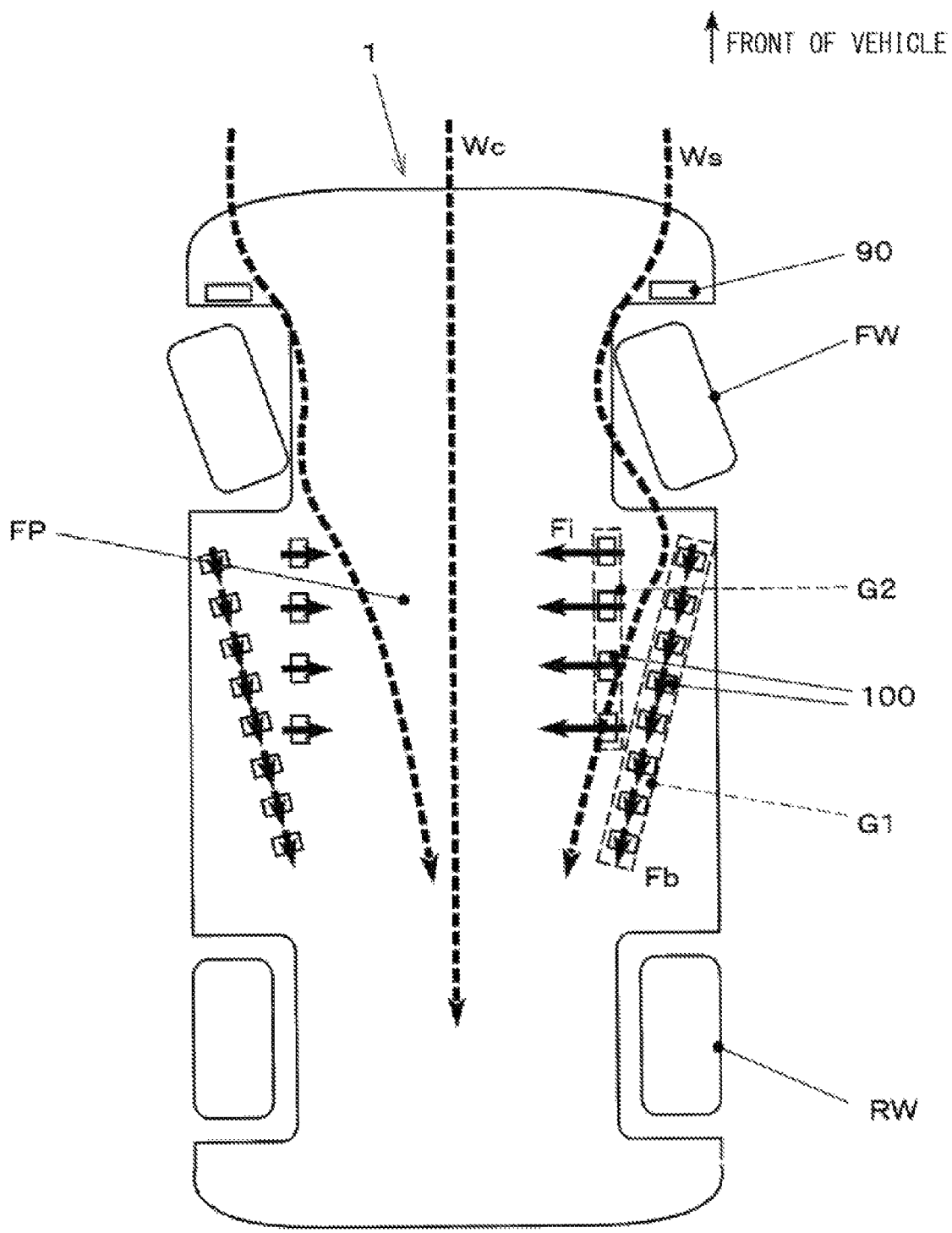
FIG. 5 schematically illustrates the vehicle according to the first embodiment, as viewed from underneath, with front wheels steered.

FIG. 5 schematically illustrates the vehicle of the embodiment, as viewed from underneath, with the front wheel steered.

FIG. 5 illustrates an example where the vehicle is turning to the right, with the left front wheel FW (on the right in FIG. 5) being steered toe-in, and with the right front wheel FW (on the left in FIG. 5) being steered toe-out.

In a case where the front wheel FW is being steered toe-out, an airflow that has separated itself at the front wheel FW moves obliquely vehicle-widthwise outward on the rear side of the vehicle in the vehicle longitudinal direction. This causes difficulty in joining the relative wind Ws to the relative wind Wc moving centrally of the vehicle.

In this embodiment, on whichever side of the vehicle on which the front wheel FW is being steered toe-out, the airflows Fi to be generated by the plasma actuators 100 of the second group G2 are increased in the flow rate and the amount of flow. This encourages the relative wind Ws to be drawn toward centrally of the vehicle.

As described, in this embodiment, it is possible to produce the following effects.

(1) The relative wind Ws that has separated itself at the front wheel FW or other components around the front wheel FW, typically the flap 90, becomes stagnant behind the front wheel FW. Allowing the plasma actuators 100 to generate the airflows Fb makes it possible to accelerate the relative wind Ws, send the relative wind Ws toward centrally of the vehicle, and join the relative wind Ws to the relative wind Wc moving vehicle-widthwise centrally of the vehicle. This makes it possible to increase flow rates of the airflows moving centrally of the vehicle, leading to suppression of Karman vortex on the rear side of the vehicle and disturbance of airflows along outer side surfaces of the vehicle. Hence, it is possible to reduce air resistance of the vehicle 1 and enhance operation stability.

(2) The plasma actuators 100 of the first group G1 may each be configured to generate the airflow Fb that moves backward of the vehicle and vehicle-widthwise inward, and moves obliquely relative to the vehicle longitudinal direction. The plasma actuators 100 of the first group G1 may be disposed along the direction of movement of the airflow Fb. This allows the plurality of the plasma actuators 100 to accelerate sequentially the relative wind Ws that has separated itself around the front wheel FW and become stagnant behind the front wheel FW. Hence, it is possible to join the relative wind Ws at a higher flow rate to the relative wind Wc moving centrally of the vehicle.

(3) The plasma actuators 100 of the second group G2 may each be configured to generate the airflow Fi that moves vehicle-widthwise inward. The plasma actuators 100 of the second group G2 may be disposed along the vehicle longitudinal direction of the vehicle 1. This makes it possible to guide, toward vehicle-widthwise centrally of the vehicle, the relative wind Ws flowing between the front wheel FW and the rear wheel RW. Hence, it is possible to reliably join the relative wind Ws to the relative wind Wc moving centrally of the vehicle, leading to suppression of air resistance due to collision of the relative wind Ws with the rear wheel RW, aerodynamic noise, i.e., wind noise, at the rear wheel.

(4) The plasma actuators 100 of the second group G2 may be disposed vehicle-widthwise inwardly from the plasma actuators 100 of the first group G1. This makes it possible to allow the plasma actuators 100 of the second group G2 to draw, toward centrally of the vehicle, the relative wind Ws having been accelerated to a higher flow rate by the plasma actuators 100 of the first group G1. Hence, it is possible to join the relative wind Ws to the relative wind Wc moving centrally of the vehicle.

(5) The plasma actuator 100 may serve as an "airflow generator" in one embodiment of the disclosure. Thanks to the simple configuration of the plasma actuator 100 devoid of movable components, it is possible to generate the airflows Fb and Fi with high responsiveness.

Second Embodiment

Description now moves on to an airflow adjusting apparatus according to a second embodiment of the disclosure.

The following description is given mainly of differences from the forgoing first embodiment. Constituent elements common to those of the forgoing first embodiment are denoted by the same reference characters, and description thereof is omitted.

Figure 6:
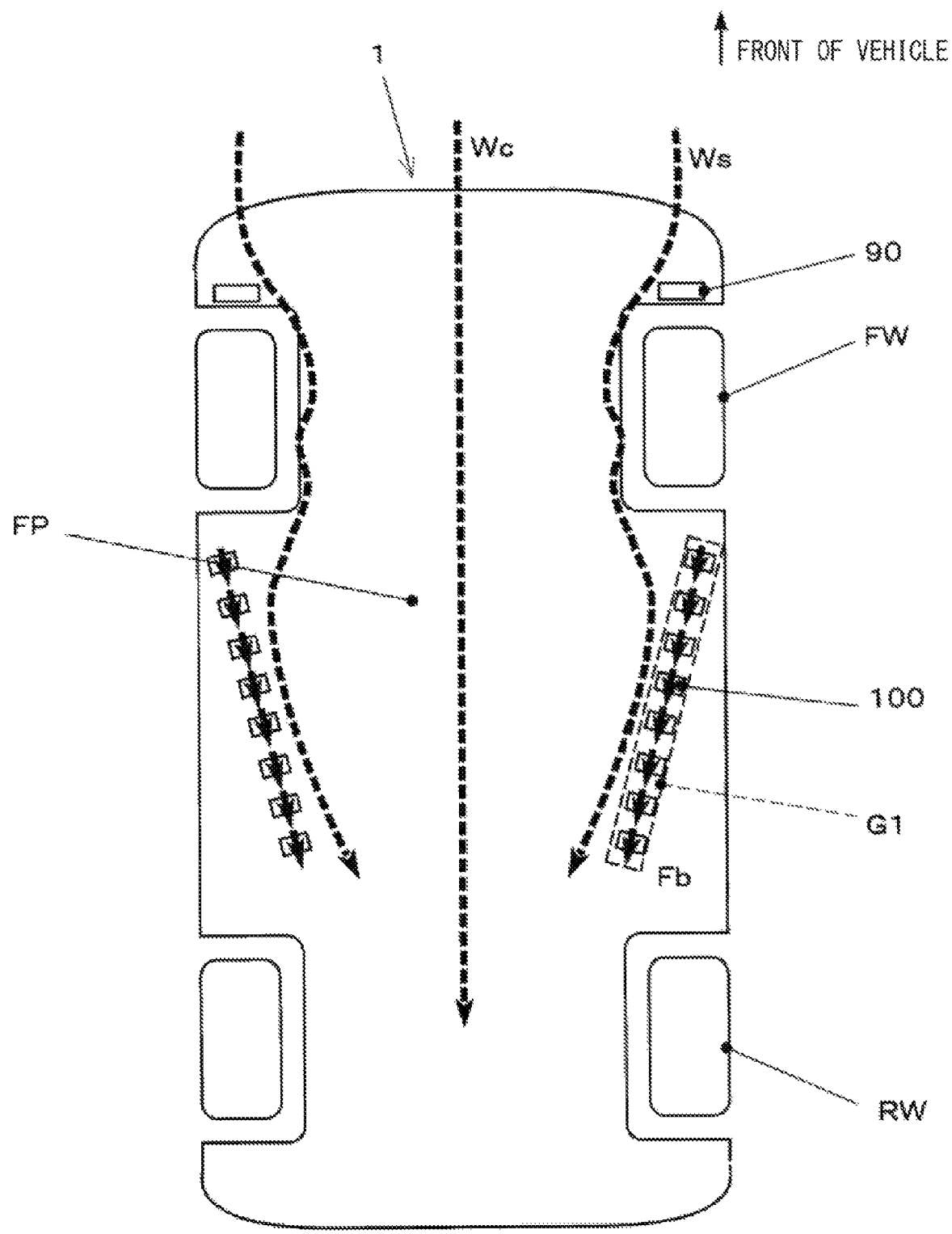
FIG. 6 schematically illustrates a vehicle according to a second embodiment, as viewed from underneath.

FIG. 6 schematically illustrates a vehicle according to the second embodiment, as viewed from underneath.

As illustrated in FIG. 6, the plurality of the plasma actuators 100 of the first group G1 is provided in the underneath of the vehicle body of the vehicle 1.

In the second embodiment, the plasma actuators 100 of the first group G1 may each be configured to generate the airflow Fb, and be disposed along the direction of movement of the airflow Fb. Hence, it is possible to produce the similar effects to those of the forgoing first embodiment.

Modification Examples

Although some embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

(1) The configurations of the vehicle and the airflow adjusting apparatus are not limited to the forgoing embodiments, but may be changed as appropriate.

(2) The arrangement and the number of the plasma actuators in the forgoing embodiments, or the "airflow generators" in one embodiment of the disclosure, are merely exemplary, and may be changed as appropriate.

(3) In the forgoing embodiments, the plasma actuator may serve as the "airflow generator" in one embodiment of the disclosure, but the airflow generation may be carried out by other methods than the use of the plasma actuator.

The configuration of the plasma actuator is not limited to those of the forgoing embodiments, but may be changed as appropriate.

For example, in the forgoing embodiment, the bipolar plasma actuator is adopted, but a three-pole plasma actuator may be adopted. The three-pole plasma actuator may include a plurality of electrode pairs.

(4) In the forgoing embodiments, the alternating voltage is applied between the electrodes of the plasma actuator. However, in an alternative configuration, a DC voltage may be applied. For example, a DC voltage may be pulsed at a predetermined frequency. In the case with the DC voltage application, polarity may be switchable, to control a direction of the generation of the airflow.

In a case with the use of the three-pole plasma actuator, an alternating voltage may be applied to both electrode pairs, or alternatively, a DC voltage may be applied to both electrode pairs. In another alternative, an alternating voltage may be applied to one electrode pair, while a DC voltage may be applied to the other electrode pair.

According to an aspect of the technology, an airflow adjusting apparatus includes a plurality of airflow generators. The plurality of the airflow generators is provided in an underneath of a vehicle body and behind a front wheel, and each configured to generate an airflow along an underside of the vehicle body. The airflow has a speed component moving vehicle-widthwise inward. The plurality of the airflow generators is disposed in a distributed arrangement in a vehicle longitudinal direction.

An airflow that has separated itself at or around the front wheel becomes stagnant behind the front wheel. Allowing the plurality of the airflow generators to generate the airflows makes it possible to accelerate the relevant airflow, send the relevant airflow toward centrally of the vehicle, and join the relevant airflow to an airflow moving centrally of the vehicle under a floor of the vehicle. This makes it possible to increase flow rates of the airflows moving centrally of the vehicle, leading to suppression of Karman vortex on the rear side of the vehicle and disturbance of airflows along outer side surfaces of the vehicle. Hence, it is possible to reduce air resistance of the vehicle 1 and enhance operation stability.

Moreover, some or all of the plurality of the airflow generators may each be configured to generate an airflow that moves backward of the vehicle and vehicle-widthwise inward, and moves obliquely relative to the vehicle longitudinal direction. The some or all of the plurality of the airflow generators may be disposed along a direction of movement of the relevant airflow.

This allows the plurality of the plasma actuators to accelerate sequentially an airflow that has separated itself around the front wheel and become stagnant behind the front wheel. Hence, it is possible to join the relevant airflow at a higher flow rate to the air flow moving centrally of the vehicle.

Furthermore, some or all of the plurality of the airflow generators may each be configured to generate an airflow that moves vehicle-widthwise inward. The some or all of the plurality of the airflow generators may be disposed along the vehicle longitudinal direction.

This makes it possible to guide, toward vehicle-widthwise centrally of the vehicle, an airflow moving between the front wheel and the rear wheel. Hence, it is possible to reliably join the relevant airflow to the airflow moving centrally of the vehicle, leading to suppression of air resistance due to collision of the relevant airflow with the rear wheel, aerodynamic noise, i.e., wind noise, at the rear wheel.

In addition, the plurality of the airflow generators may include a first group of airflow generators and a second group of airflow generators. The second group of the airflow generators may be disposed in the vehicle longitudinal direction and vehicle-widthwise inwardly from the first group of the airflow generators.

This makes it possible to allow the airflow generators of the second group to draw, toward centrally of the vehicle, the airflow that has separated itself around the front wheel to become stagnant behind the front wheel, and has been sequentially accelerated to a higher flow rate by the airflow generators of the first group. Hence, it is possible to join the relevant airflow to the airflow moving centrally of the vehicle.

Moreover, the plurality of the airflow generators may each include a plasma actuator. The plasma actuator may include: at least one pair of electrodes disposed with a dielectric in between; and a power supply configured to apply a voltage to the at least one pair of the electrodes.

Thanks to the simple configuration of the airflow generator devoid of movable components, it is possible to generate the airflow with high responsiveness.

As described, according to the aspects of the technology, it is possible to provide an airflow adjusting apparatus that makes it possible to adjust appropriately airflows that has separated itself at or around a front wheel.

The airflow adjustment processor 200 illustrated in FIG. 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the airflow adjustment processor 200. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the airflow adjustment processor 200 illustrated in FIG. 4.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. An airflow adjusting apparatus to be provided in a vehicle, the vehicle including a front wheel and a rear wheel that are disposed in a vehicle longitudinal direction to be partly protruded from a bottom surface of a vehicle body of the vehicle downward in a vertical direction of the vehicle body, the airflow adjusting apparatus comprising
   airflow generators provided on the bottom surface of the vehicle body and behind the front wheel, each of the airflow generators configured to generate an airflow along the bottom surface of the vehicle body, the airflow having a speed component moving vehicle-widthwise inward, the airflow generators being disposed in a distributed arrangement in the vehicle longitudinal direction.

2. The airflow adjusting apparatus according to claim 1, wherein
   some or all of the airflow generators are each configured to generate a first airflow that moves backward of the vehicle and vehicle-widthwise inward, and moves obliquely relative to the vehicle longitudinal direction, the some or all of the airflow generators being disposed along a direction of movement of the first airflow.

3. The airflow adjusting apparatus according to claim 1, wherein
   some or all of the airflow generators are each configured to generate an airflow that moves vehicle-widthwise inward, the some or all of the airflow generators being disposed along the vehicle longitudinal direction.

4. The airflow adjusting apparatus according to claim 2, wherein
   some or all of the airflow generators are each configured to generate an airflow that moves vehicle-widthwise inward, the some or all of the airflow generators being disposed along the vehicle longitudinal direction.

5. The airflow adjusting apparatus according to claim 1, wherein
   the airflow generators include:
      a first group of airflow generators each configured to generate a first airflow that moves backward of the vehicle and vehicle-widthwise inward, and moves obliquely relative to the vehicle longitudinal direction, the first group of the airflow generators being disposed along a direction of movement of the first airflow; and
      a second group of airflow generators each configured to generate a second airflow that moves vehicle-widthwise inward, the second group of the airflow generators being disposed in the vehicle longitudinal direction and vehicle-widthwise inwardly from the first group of the airflow generators.

6. The airflow adjusting apparatus according to claim 1, wherein
the airflow generators each include a plasma actuator including:
at least one pair of electrodes; and
a power supply configured to apply a voltage to the at least one pair of the electrodes.

7. The airflow adjusting apparatus according to claim 2, wherein
the airflow generators each include a plasma actuator including:
at least one pair of electrodes; and
a power supply configured to apply a voltage to the at least one pair of the electrodes.

8. The airflow adjusting apparatus according to claim 3, wherein
the airflow generators each include a plasma actuator including:
at least one pair of electrodes; and
a power supply configured to apply a voltage to the at least one pair of the electrodes.

9. The airflow adjusting apparatus according to claim 4, wherein
the airflow generators each include a plasma actuator including:
at least one pair of electrodes; and
a power supply configured to apply a voltage to the at least one pair of the electrodes.

10. The airflow adjusting apparatus according to claim 5, wherein
the airflow generators each include a plasma actuator including:
at least one pair of electrodes; and
a power supply configured to apply a voltage to the at least one pair of the electrodes.

* * * * *